United States Patent Office 3,022,889
Patented Feb. 27, 1962

3,022,889
ELECTROSTATIC SEPARATION OF NORMALLY
LIQUID MATERIALS
Ira M. Le Baron, Evanston, Ill., and Gene L. Samsel, Mulberry, Fla., assignors to International Minerals & Chemical Corporation, a corporation of New York
No Drawing. Filed Jan. 19, 1959, Ser. No. 787,384
13 Claims. (Cl. 209—2)

This invention relates to separation of mixtures of normally liquid materials and more particularly relates to separation of mixtures of normally liquid materials by an electrostatic process.

Many of the products of chemical processes and chemical reactions are in the form of mixtures of normally liquid materials. These mixtures may contain a group of isomers or else may contain a plurality of closely related chemical compounds formed in the particular reaction. In many instances it is extremely difficult to efficiently or economically separate these liquid mixtures and obtain a specifically desired product in a commercially valuable yield.

In the case of normally liquid mixtures of isomers, the problem strikingly may be illustrated with xylene. Xylene, whether produced by distillation of petroleum or by distillation of coal tar oil, is obtained in a mixture of its ortho-, meta- and para-isomers, which boil, respectively, at 144° C., 138.8° C. and 138.5° C. For many uses, such as a solvent or an additive in aviation fuel, separation of the mixture of isomers is not necessary. Paraxylene, however, is a basic chemical in the production of terphthalic acid which is in turn employed to produce highly valuable polyester fibers. The currently available methods of separating p-xylene from the mixture of isomers, viz., fractional distillation, fractional crystallization, solvent extraction, absorption, and the like, are not satisfactory.

Mixtures of normally liquid, chemically related but nonisomeric materials present a similar problem. Benzene produced from coal tar or highly sulfur-contaminated crude oils is normally contaminated with a substantial amount of thiophene. Cold tar benzene also contains a substantial amount of pyridine. Dehydrohalogenation of chlorinated ethanes produces difficultly separable mixtures of tetrachloroethylene, trichloroethylene and 1,2 dichloroethylene. Mixtures of mesitylene and cumene or of ortho-, meta- and para-cymenes also are extremely difficult to separate.

In view of these and other similar difficulties experienced by the art, the primary object of the present invention is an improved method for separating mixtures of normally liquid materials.

A further object of the invention is a method for separating normally liquid materials having close boiling points which does not require expensive distillation towers, contact apparatus, and the like.

Another object of the invention is an efficient and economical process for separating normally liquid, closely related chemical compounds.

An additional object of the invention is an efficient and economical process for separating normally liquid mixtures of isomeric materials.

A particular object of the invention is an electrostatic process for more economically and efficiently separating mixtures of normally liquid isomers and other difficultly separable, normally liquid compounds.

Yet another object of the invention is an electrostatic method for separating a normally liquid material from its admixtures with eutectics containing the said normally liquid material.

Generally described, the present invention is a method for separating mixtures of normally liquid materials which comprises reducing the temperature of the mixture until said liquid materials crystallize, inducing the crystals to accept differential electrical charges while at a temperature below the melting point of said crystals, and passing the differentially charged crystals, while at a temperature below their melting point, into an electrostatic field to separate at least one fraction rich in crystals of one of the components of said mixture of normally liquid materials.

The normally liquid materials which are separated in accordance with the method of the invention may be mixtures of isomers or else may be mixtures of other compounds from which it is desirable to separate one or more specific materials. Normally liquid mixtures of isomers which may be separated include, without limitation, mixtures of xylenes, dichlorobenzenes, chlorotoluenes, cymenes, toluidines, the propyl benzenes, the monomethyl naphthalenes, the cresols, the chloronitrobenzenes, the xylenols, the phenols, the chloroanilines, the dioxanes, the amyl alcohols, the quinolines, and the like. Normally liquid mixtures of nonisomers which may be separated by the method of the invention, without limitation, include the following: benzene-thiophene; benzene-pyrrols; benzene-pyridine; tetrachloroethylene-trichloroethylene-1,2-dichloroethylene; mesitylene-cymene; piperidine-pyridine, and the like.

This invention also contemplates the separation of a first normally liquid material from its admixture with an eutectic of said material and at least one other normally liquid material. The invention embraces, inter alia, the separation of a xylene isomer from an eutectic of xylene isomers, and a dichlorobenzene isomer from an eutectic of dichlorobenzene isomers. The temperature of the mixture is reduced to a temperature below the melting point of the admixture whereby all the components are crystallized, the crystals are induced to accept differential electrical charges, and are passed into an electrostic field to separate the first material from the eutectic.

In accordance with the invention, the temperature of the normally liquid mixture is lowered until the components between which separation is desired, have crystallized, and while the crystals are maintained at a temperature below their melting point, they are induced to accept differential electric charges. The differentially charged particles, while still at a temperature below their melting point, are then passed into an electrostatic field to effect separation and to recover a concentrate rich in the desired material. If necessary or desirable, the middlings and/or tailings may be recirculated to the electrostatic process either before or after the charging step. The concentrate also may be further concentrated by a plurality of passes through the electrostatic field—either with or without a further charging step. Once the desired separation is achieved, either in a single pass or in a plurality of passes through the electrostatic field, the crystal fractions either may be allowed to liquefy, or heated if accelerated liquefaction is desired.

The cooling of the liquid mixture to be separated may be effected by means known to the art, such as by the various known refrigeration procedures, by means of Dry Ice, liquid nitrogen, and the like.

It is desirable that the surfaces of the crystalline material be substantially dry with respect to any liquid which may be present prior to the charging step. Drying can be effected by centrifuging, vacuum drying, forced air drying, and the like, or combinations of such expedients. The drying procedure must, in all cases, be consistent with the temperatures requisite to maintaining in solid form the materials undergoing separation.

In accordance with the invention, the particles preferably are induced to accept differential charges through the medium of contact electrification. Contact electrification results from the movement of matter in response to such stimuli as differences in escape rate of positive or negative charges, or transfer of electrons or ions across an interface due to differences in energy levels and the like. It has been determined that real crystals never attain the static perfection of ideal crystal lattices, and that a real crystal may have distorted surfaces, displaced ions or atoms, intersticial sites, surface sites, and charge displacement, due to separated anion-cation pairs of abnormally ionized atoms and trapped electrons. It is postulated that these traps are capable of acting as donors and acceptors of electrons and it is these traps which are probably the controlling influence in contact electrification. In contact electrification, temperature, impurity content, and mechanical history of the various surfaces involved are the primary variables to be considered in determining the precise conditions requisite to optimum separations of particular materials.

Contact electrification preferably is obtained by essentially particle-to-particle contact of the material while the surfaces thereof are essentially dry. Ideally, the particles will not contact a metal or grounded metal surface during the charging operation, since donor plate charging, while operable, often results in the building up of negative charges on all of the particles of the mixture, thus rendering the problem one of separating particles having a different level of the same charge rather than the more desirable situation in which particles of opposite charge are being separated in the electrostatic field.

The desired particle-to-particle charging may be effected in numerous ways, such as by tumbling the particles down an elongated chute in such quantity that contact between the particles and the chute is at a minimum. Alternatively, the particulate material, while maintained at the desired temperature, may be delivered from a source of supply to the electrostatic separator by means of a vibrating trough. At commercial throughputs, the great preponderance of charging in this manner is engendered by particle-to-particle contact rather than by contact of the particles with the trough. Suitable charging also may be obtained by air agitation, tumbling in a suitable drum, and the like.

The electrostatic separator does not, per se, constitute a part of the present invention, and may be any one of the several commercially available designs. For example, a roll-type electrostatic separator, such as the well-known Johnson, Sutton, or Carpo Separators, may be employed. Preferably, however, the particulate isomeric mixture will be separated by passing the particulate materials as freely falling bodies through an electrostatic field. Desirably, the charge on the material will be substantially unaltered following the charging step as it is delivered to or passes through the electrostatic field. Thus, in the free-fall process any corona discharge causing bombardment of the field with ions or electrons or any contact which materially will effect alteration of the charge on the individual particle as it is introduced into or passed through the electrostatic field, preferably is avoided. In practicing the preferred free-fall process to separate the particulate isomeric material in accordance with this invention, it is desirable to employ apparatus which minimizes the possibility of altering the previously acquired charge with corona discharge or by exposing the previously charged material to inductive conduction, such as may be encountered in the roll-type separators previously referred to. Instead, it is desirable to employ either flat plates or relatively large rolls or cylinders as electrodes which are specifically designed to minimize corona, and to avoid metal contact in the presence of the electrostatic field which will result in inductive conduction and/or any alteration of the charge on the particles.

When employing the "free-fall" electrostatic separation process, the surfaces of the oppositely charged electrodes of the electrostatic separator desirably will be positioned or formed at an angle to the normal path of flow of the material if undiverted by the electrostatic forces. Such arrangement of electrodes is provided to make the angle of the divergency as great as possible, thus permitting the separation of materials with dividers to be accomplished more readily. Although a variety of electrostatic apparatus may be employed in conducting the process of this invention, it is preferred that the electrostatic field be created by one or more pairs of spaced, positively charged electrodes, the lower portions of which curve outwardly from the perpendicular. The pair of electrodes desirably is secured in place by members with smooth, convex surfaces. Although the field gradient may vary considerably, it has been found that gradients of from 6,000 to 15,000 volts per inch are sufficient for most separations. The preferred type of free-fall apparatus is more specifically disclosed and described in U.S. Patent 2,738,875.

The method of the invention is applicable to a wide variety of particle sizes. The particle size which must be employed to give optimum separation for a particular material is dependent largely on the strength of the electrostatic field and the residence time of the particle in the field. Thus, in the preferred free-fall type of separator, the maximum particle size desirable will depend on the voltage gradient and the length of the electrodes. It will be apparent that larger and heavier particles may be separated where the field strength is high and/or where the length of the drop between the electrodes is such as to provide additional time for the attractive and repulsive forces in the field to act on the differentially charged particles. Particles substantially finer than about 150 mesh are not desirable when employing roll-type separators, although considerably smaller particles usually may be employed in a free-fall separator. In general, particles of from about 10 to about 150 mesh are preferred when employing a roll-type separator, and particles ranging between 20 and 250 mesh are preferred for free-fall type separators. It will be understood that optimum mesh sizes will vary from substance to substance and with the particular process conditions employed.

Having generally described the present invention, the following examples are presented to illustrate specific embodiments thereof:

Example I

Ortho- and para-dichlorobenzenes were separately cooled below the point of crystallization and the resulting crystals were admixed in equal proportions, maintained at a temperature of −40° C. and screened to obtain a feed of −20 mesh. The −20 mesh crystalline feed material was agitated to effect contact electrification by particle-to-particle contact, and then dropped in a thin stream through an electrostatic field produced by spaced, vertically disposed electrodes and characterized by a field were caught in a series of eight pans disposed beneath gradient of about 10,000 volts per inch. The crystals the electrodes. The material collected in pans 1, 2, and 3 assayed 87% para-dichlorobenzene, while the material collected in pans 6, 7, and 8 assayed 80% ortho-dichlorobenzene.

Example II

Ortho- and para-xylenes were separately cooled below the point of crystallization and the resulting crystals were admixed in equal proportions, maintained at a temperature of −78° C. and were screened to obtain a fraction of −20 mesh. The −20 mesh material was differentially charged by particle-to-particle contact and passed through a free-fall electrostatic separator as in Example I. The material collected in pans 1, 2, and 3 assayed 71% para-xylene and that collected in pans 6, 7 and 8 assayed 90% ortho-xylene.

Example III

Ortho-, meta-, and para-xylenes were separately cooled with liquid nitrogen below the point of crystallization, the resulting crystals were admixed in equal proportions and maintained at a temperature of −192° C. and were screened to obtain a fraction of −20 mesh. The −20 mesh material was differentially charged by particle-to-particle contact and passed through a free-fall electrostatic separator as in Example I. Since meta- and para-xylenes cannot be distinguished by gas chromatography, an infrared analysis also was conducted to indicate the relative proportions of meta- and para-isomers present. The material collected in the various pans assayed:

| Pan | Gas chromatography | | Infrared analysis | | |
|---|---|---|---|---|---|
| | Ortho-, percent | Meta- and para-, percent | Ortho-, percent | Meta-, percent | Para-, percent |
| 1 | 5 | 95 | 12 | 46 | 42 |
| 2 | 9 | 91 | 14 | 45 | 41 |
| 3 | 12 | 88 | 18 | 41 | 41 |
| 4 | 17 | 83 | 20 | 50 | 30 |
| 5 | 24 | 76 | 27 | 50 | 23 |
| 6 | 59 | 41 | 57 | 24 | 19 |
| 7 and 8 | 63 | 37 | 55 | 25 | 20 |

*Example IV*

A mixture containing 85% ortho-dichlorobenzene and 15% para-dichlorobenzene (an eutectic mixture) was prepared and cooled to −50° C. with liquid nitrogen. The resulting solid was ground and screened to give a −20 mesh fraction. This −20 mesh material was then cooled in liquid nitrogen and added to an equal amount of similarly cooled −20 mesh para-dichlorobenzene. The −20 mesh material was differentially charged by particle-to-particle contact and passed through a free-fall electrostatic separator as in Example I. The material collected in the various pans assayed:

Pans:
1, 2, 3 _____ 88% para-
5 _____ 77% ortho-
6, 7, 8 _____ 93% ortho-

The analysis of pans 1, 2, and 3 showed a good separation of para-isomer from the eutectic mixture of ortho- and para-isomers. The analysis of pans 6, 7, and 8 also indicated that the eutectic was separated to a certain extent into its component parts.

*Example V*

Para- and meta-xylenes were separately cooled with liquid nitrogen below the point of crystallization. The resulting crystals were maintained below their melting point, were screened to obtain a −20 mesh material, and the −20 mesh fractions were mixed in equal proportions. The −20 mesh mixture was then passed through a free-fall electrostatic separator as in Example I. The material collected in the various pans assayed as follows:

| Pan | Percent para-xylene | Percent meta-xylene |
|---|---|---|
| 1 | 47 | 53 |
| 2 | 46 | 54 |
| 3 | 43 | 57 |
| 4 | 32 | 68 |
| 5 | 41 | 59 |
| 6 | (¹) | |
| 7 and 8 | 85 | 15 |

¹ Accidentally lost.

*Example VI*

Ortho- and meta-xylenes were separately cooled with liquid nitrogen to below the point of crystallization. The resulting crystals, while maintained below their melting point, were screened to obtain a −20 mesh material and the −20 mesh fractions were mixed in equal proportions. The −20 mesh mixture was then passed through a free-fall electrostatic separator as in Example I. The material collected in the various pans assayed as follows:

| Pan | Percent ortho-xylene | Percent meta-xylene |
|---|---|---|
| 1 | 42 | 58 |
| 2 | 44 | 56 |
| 3 | 50 | 50 |
| 4 | 63 | 37 |
| 5 | 60 | 40 |
| 6 | 73 | 27 |
| 7 and 8 | 65 | 35 |

In considering the results of the separations described in the foregoing examples, it will be appreciated that only a single pass through the electrostatic field was made. Fractions having even higher concentration of the desired component or components readily can be obtained by employing a plurality of fields or a plurality of passes through a single field. Similarly, yields readily may be increased by recycling the middling fractions.

From the foregoing general description and specific illustration, it is apparent that mixtures of normally liquid materials may be efficiently and economically separated by passing crystallized mixtures thereof through an electrostatic separator in accordance with the process of this invention. Since many modifications of the process herein disclosed will become apparent to those skilled in the art, it is desired that the scope of the invention be limited solely by the scope of the appended claims.

What is claimed is:

1. A method for separating mixtures of normally liquid materials which comprises reducing the temperature of the mixture until said liquid materials crystallize, inducing the crystals to accept differential electrical charges while at a temperature below the melting point of said crystals, and passing the differentially charged crystals while at a temperature below their melting point into an electrostatic field to separate at least one fraction rich in crystals of one of the components of said mixture of normally liquid materials.

2. A method for separating mixtures of normally liquid materials which comprises reducing the temperature of the mixture until said liquid materials crystallize, drying the surfaces of the crystallized material while at a temperature below the melting point of any of said material, inducing the crystals to accept differential electrical charges while at a temperature below the melting point of said crystals, and passing the differentially charged crystals while at a temperature below their melting point into an electrostatic field to separate at least one fraction rich in crystals of one of the components of said mixture of normally liquid materials.

3. A method of separating mixtures of normally liquid isomers which comprises reducing the temperature of the mixture until said liquid materials crystallize, inducing the crystals to accept differential electrical charges while at a temperature below the melting point of said crystals, and passing the differentially charged crystals while at a temperature below their melting point into an electrostatic field to separate at least one fraction rich in crystals of the desired isomer.

4. A method of separating mixtures of normally liquid isomers which comprises reducing the temperature of the mixture until said liquid materials crystallize, drying the surfaces of the crystallized material while at a temperature below the melting point of any of said material, inducing the crystals to accept differential electrical charges while at a temperature below the melting point of said crystals, and passing the differentially charged crystals while at a temperature below their melting point into an electrostatic field to separate at least one fraction rich in crystals of the desired isomer.

5. A method of separating a mixture of xylene isomers which comprises reducing the temperature of the mixture until said liquid materials crystallize, inducing the crystals to accept differential electrical charges while at a temperature below the melting point of said crystals, and passing the differentially charged crystals while at a temperature below their melting point into an electrostatic field to separate at least one fraction rich in crystals of the desired isomer.

6. A method of separating a mixture of xylene isomers which comprises reducing the temperature of a mixture of ortho-, meta-, and para-xylene to below the melting point of the meta-isomer to crystallize all of said xylenes, inducing the crystals to accept differential electrical charges while at a temperature below the melting point of said crystals, and passing the differentially charged crystals while at a temperature below the melting point of the meta-isomer into an electrostatic field to separate a concentrate rich in the para-isomer.

7. A method of separating a mixture of xylene isomers which comprises reducing the temperature of a mixture of ortho-, meta-, and para-xylene to below the melting point of the meta-isomer to crystallize all of said xylenes, drying the surfaces of the crystallized material while at a temperature below the melting point of any of said material, inducing the crystals to accept differential electrical charges while at a temperature below the melting point of said crystals, and passing the differentially charged crystals while at a temperature below the melting point of the meta-isomer into an electrostatic field to separate a concentrate rich in the para-isomer.

8. A method of separating a mixture of dichlorobenzene isomers which comprises reducing the temperature of the mixture until said liquid materials crystallize, inducing the crystals to accept differential electrical charges while at a temperature below the melting point of said crystals, and passing the differentially charged crystals while at a temperature below their melting point into an electrostatic field to separate at least one fraction rich in crystals of the desired isomer.

9. A method of separating a mixture of dichlorobenzene isomers which comprises reducing the temperature of a mixture of ortho-, meta-, and para-dichlorobenzene to below the melting point of the meta-isomer to crystallize all of said dichlorobenzenes, inducing the crystals to accept differential electrical charges while at a temperature below the melting point of said crystals, and passing the differentially charged crystals while at a temperature below the melting point of the meta-isomer into an electrostatic field to separate a concentrate rich in the para-isomer.

10. A process for separating a first normally liquid material from its admixture with an eutectic of said material and at least one other normally liquid material which comprises reducing the temperature of the said admixture to below the melting point of the admixture to crystallize all of the components thereof, inducing the crystals to accept differential electrical charges, and passing the differentially charged crystals into an electrostatic field to separate said first normally liquid material from the eutectic.

11. A process for separating a xylene isomer from an eutectic of xylene isomers which comprises reducing the temperature of a mixture of the xylene isomer and the eutectic of xylene isomers to a temperature below the melting point of both the isomer and the eutectic to crystallize both of said components, inducing the crystals to accept differential electrical charges, and passing the differentially charged crystals into an electrostatic field to separate the isomer from the eutectic.

12. A process for separating a dichlorobenzene isomer from an eutectic of dichlorobenzene isomers which comprises reducing the temperature of a mixture of the dichlorobenzene isomer and the eutectic of dichlorobenzene isomers to a temperature below the melting point of both the isomer and the eutectic to crystallize both of said components, inducing the crystals to accept differential electrical charges, and passing the differentially charged crystals into an electrostatic field to separate the isomer from the eutectic.

13. A process for separating para-dichlorobenzene from an eutectic of ortho- and para-dichlorobenzene which comprises reducing the temperature of a mixture of para-dichlorobenzene and an eutectic of ortho- and para-dichlorobenzene to a temperature below the melting point of both the para-dichlorobenzene and the eutectic to crystallize both of said components, inducing the crystals to accept differential electrical charges, and passing the differentially charged crystals into an electrostatic field to separate the para-dichlorobenzene from the eutectic.

References Cited in the file of this patent

UNITED STATES PATENTS

| | | |
|---|---|---|
| 2,696,307 | Rush | Dec. 7, 1954 |
| 2,723,029 | Lawver | Nov. 8, 1955 |

OTHER REFERENCES

Industrial and Engineering Chemistry, 32, May 5, 1940, pages 600–604.